Aug. 23, 1949.            G. F. KNOWLES            2,479,937
                            LAWN MOWER
Filed March 11, 1946                        3 Sheets-Sheet 1

Inventor:—
George F. Knowles
by his Attorneys
Howson + Howson

Aug. 23, 1949.  G. F. KNOWLES  2,479,937
LAWN MOWER
Filed March 11, 1946  3 Sheets-Sheet 3

Inventor:—
George F. Knowles
by his Attorneys
Howson & Howson

Patented Aug. 23, 1949

2,479,937

UNITED STATES PATENT OFFICE 2,479,937

LAWN MOWER

George F. Knowles, Philadelphia, Pa., assignor, by direct and mesne assignments, of one-fourth to Fred H. C. Hancock, and one-half to Muriel K. Hancock, both of Baltimore, Md.

Application March 11, 1946, Serial No. 653,522

9 Claims. (Cl. 56—26)

This invention relates to lawn mowers and more particularly to a lawn mower having a power-driven cutter reel.

An important object of the invention is the provision of a reel for use in lawn mowers of such construction that it is particularly well suited for use in cutting over-long grass although equally well adapted for the ordinary lawn trimming operations.

A more specific object of the invention is the provision of a reel, the cutting blades of which are so constructed that they operate upon the grass as a sickle rather than a shear and in which the blades are presented to the grass for their principal cutting operations at substantially right angles to the stems.

Another object of the invention is the provision of a cutting reel, the knives of which are so constructed that when operating in long grass, the blades of grass will be subdivided into a plurality of short sections, thus eliminating the tendency of long sections to entangle themselves in the moving parts and interfere with operation.

A further object of the invention is the production of cutting blades for reels of lawn mowers which may be very readily constructed by stamping from sheet metal and which may be very readily applied to and removed from the reel.

A still further object of the invention is the provision of a lawn mower, the blades of which may be readily sharpened by the movement in a fixed path of a grinding implement tangentially disposed to the path of movement of the blades during rotation of the reel.

These and other objects I attain by the construction shown in the accompanying drawings wherein, for the purpose of illustration, I have shown a preferred embodiment of my invention and wherein:

Fig. 8 is an enlarged section on line 8—8 of Fig. 1.

Figure 1:
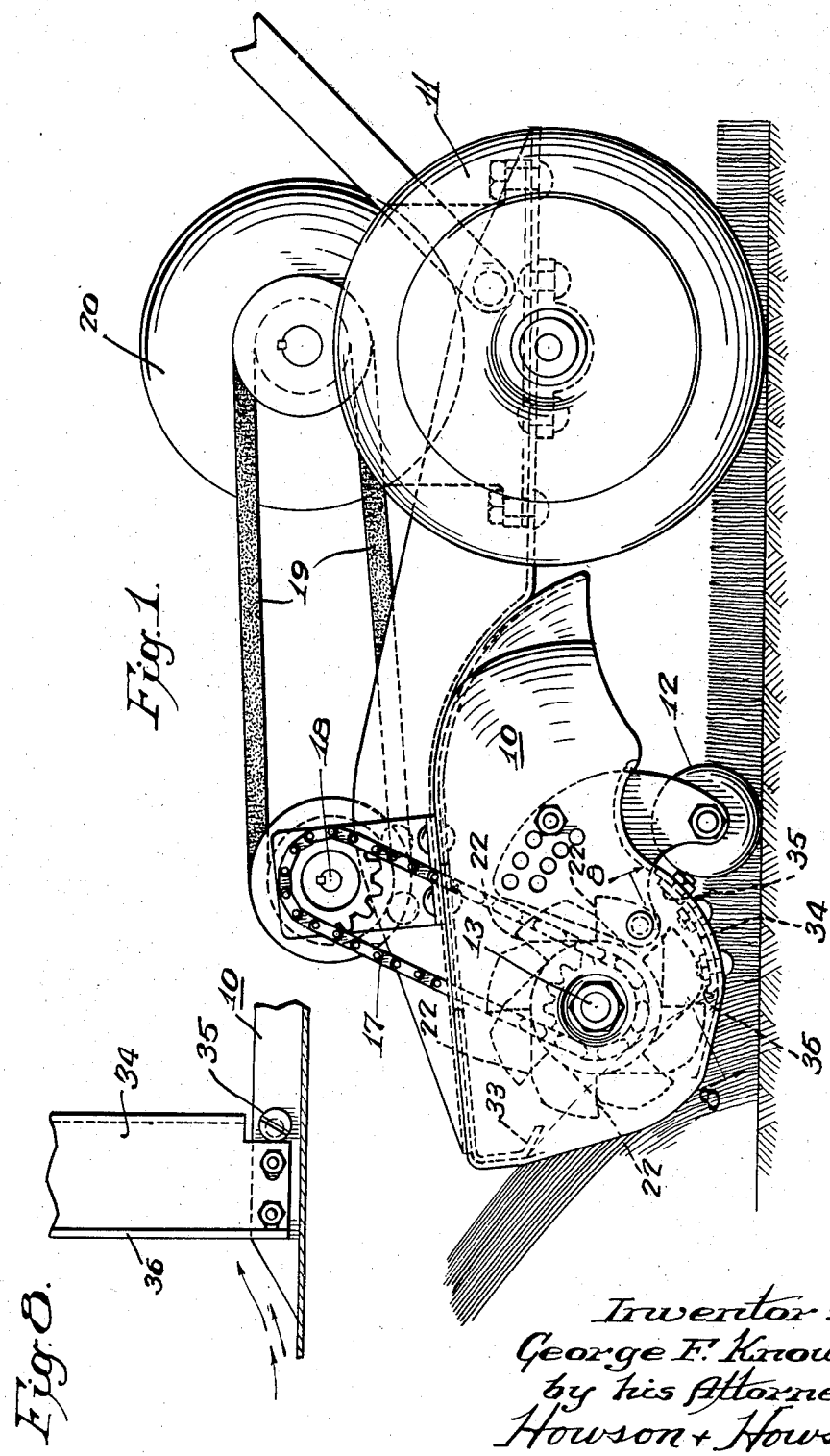
Fig. 1 is a side elevation of a lawn mower employing a reel constructed in accordance with my invention.

Referring now more particularly to the drawings, numeral 10 generally designates a frame preferably formed from sheet metal stampings and supported adjacent its rear end by wheels 11 and adjacent its forward end by rollers 12, the latter being adjustable to permit raising and lowering of the forward end of the frame as desired. Adjacent the forward end of the frame a stationary shaft 13 supports a spindle 15 for the bearings 16. This spindle is, through a chain and sprocket connection 17, jack shaft 18 and belt 19, driven from a motor 20 mounted on the frame at a point preferably located between the rear supporting wheels 11. The driving connection is such that the speed of rotation of the reel is approximately that of the driving motor which, in the present instance, is illustrated as an electrical motor having a preferred operating speed of approximately 2000 R. P. M.

Figure 2:
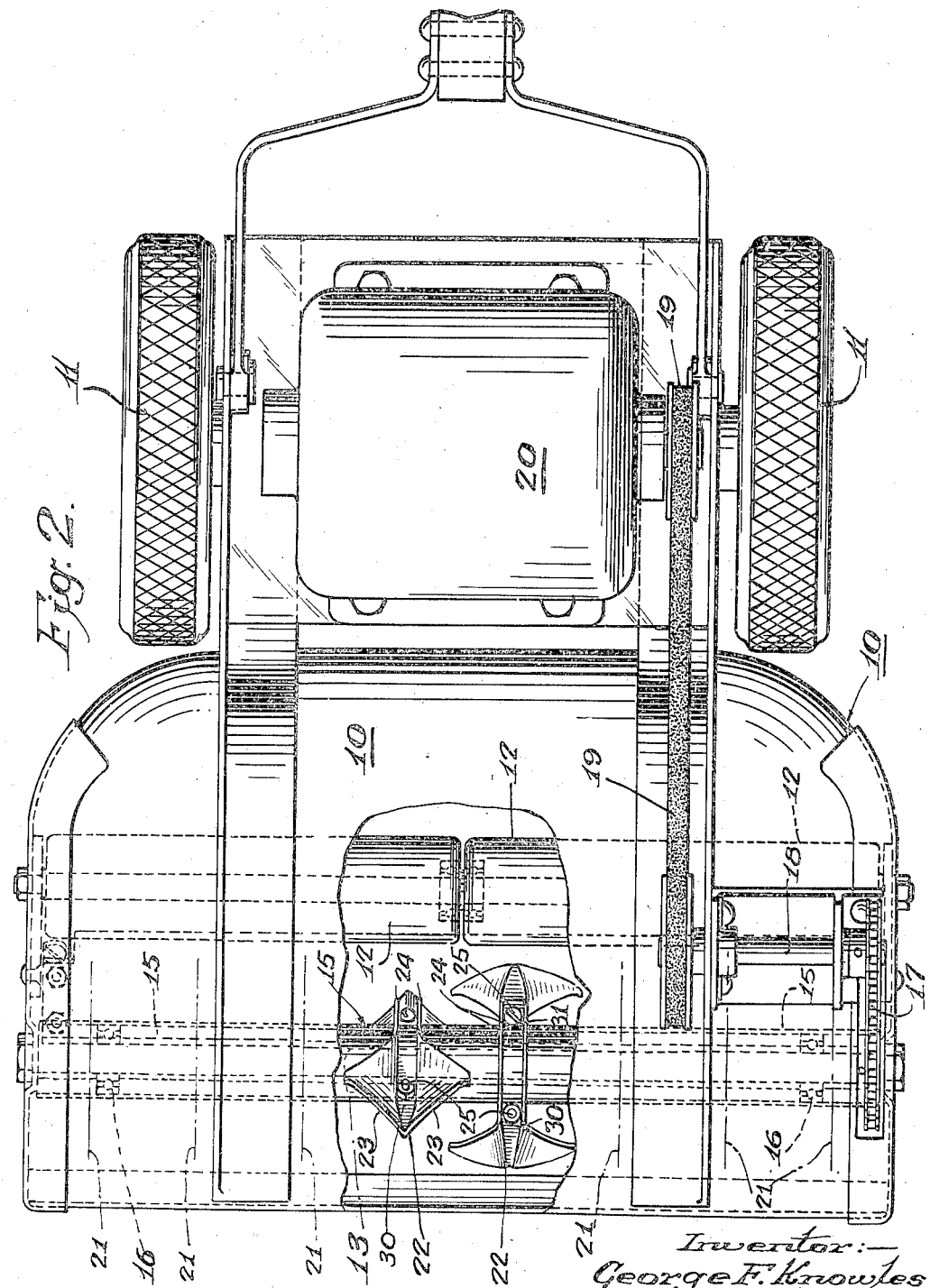
Fig. 2 is a plan view thereof, a portion of the frame being cut-away to illustrate certain features of the invention.
Figure 3:
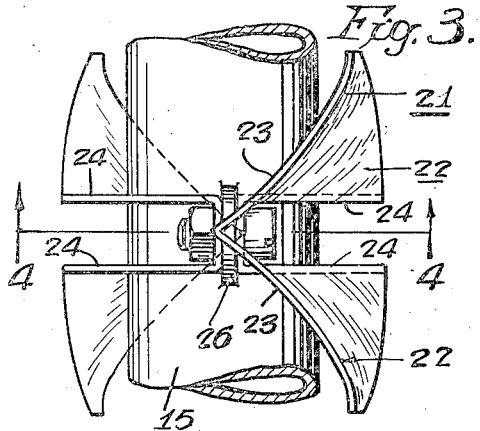
Fig. 3 is an enlarged plan view of a portion of the reel illustrating the blade construction.
Figure 6:
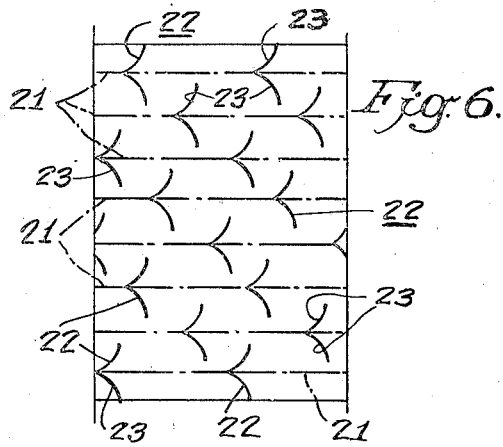
Fig. 6 is a diagrammatic development of the reel illustrating a preferred disposition of the knives about the periphery thereof.
Figure 4:
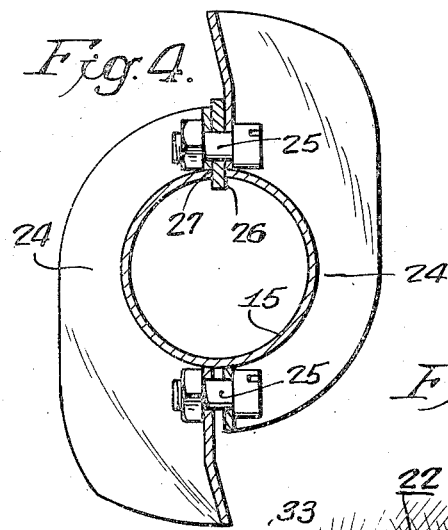
Fig. 4 is a section on line 4—4 of Fig. 3.

Mounted upon the spindle 15 are a plurality of axially-spaced blade series 21, each comprising a plurality of blades 22 and the blades of each series being staggered with relation to those of adjacent series, and as shown in Figs. 2 and 6, the blade series operate in overlapping paths. Each blade comprises a substantially V-shaped cutting edge 23 concentric with the spindle 15 and a rearwardly extending tang 24, the inner face of which is internally shaped to conform to the contour of, and to receive the spindle.

Figure 5:
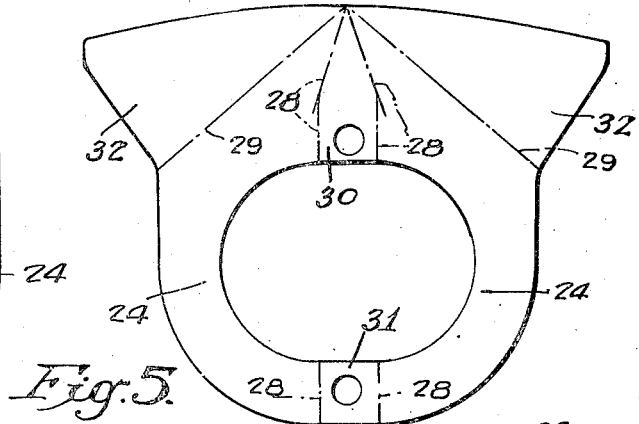
Fig. 5 is a plan view in the same scale as Figs. 3 and 4 of the blank from which the individual knives are formed.
Figure 7:
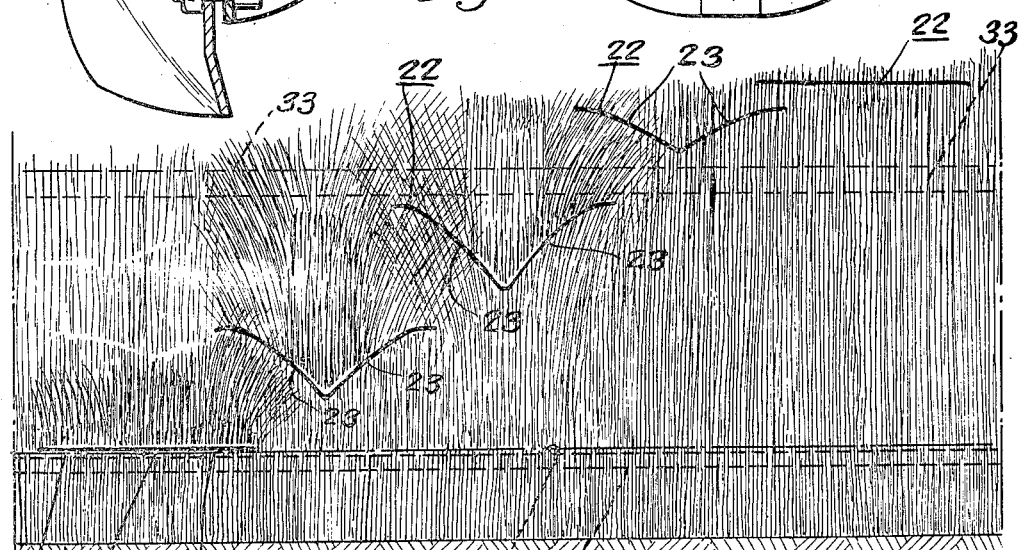
Fig. 7 is a diagrammatic front elevation illustrating the action of the knives in passage through the blades of grass.

The arcuate length of this internally shaped face of each blade unit is such that the combined lengths of said faces are slightly less than the circumference of spindle 15 and the blades of the series are connected by bolts 25 which serve to clamp the blade series in desired position upon the spindle. If desired, and as shown, the clamping action may be reinforced by disposing upon one or more of the connecting bolts a key 26 engaging in a slot 27 formed in the spindle. This key may take the form of an ordinary washer. A blade of the type illustrated may be readily produced from a blank of the type illustrated in Fig. 5. This blank is folded upon the dotted lines 28 and 29 thereby producing front and rear walls 30 and 31 the flaring wings 32 which form the blade proper.

It will be noted that the rearwardly flaring knife edges of the blade are curved of sickle form with the concave edges thereof facing in the direction of rotation and that the tips of these blades are directed substantially in the direction of the axis of the spindle. In advance of the cutter reel and at a point slightly above the center thereof, the frame includes a transversely extending deflector bar 33. Arranged transversely of the frame beneath the reel is a ledger bar 34. This bar may be adjusted as shown in Fig. 8 by loosening the nuts shown and turning a cam 35 to regulate position of said bar with respect to the frame portion 10. The bar 34 has an upturned ledge 36 at its forward edge over which the cutting edges of the knives pass with a slight clearance.

In the operation of a lawn mower of this character, assuming that the grass is long, as illustrated, the deflector bar 33 bends the grass forwardly to an extent such that the initial contact of the knives with the grass occurs when the blade is traveling at approximately right angles thereto. The apex of each knife divides the grass, causing it to pass over the sickle-like edges of the knife until it arrives at the outer ends thereof at which point unsevered grass is thrown outwardly into the path of succeeding knives of the adjacent series by the axially extending blade tips. Continuing its downward movement, the knife again attacks the grass at right angles as it passes over the forward edge of the ledger bar. With rapidly rotating knives, this will result in long grass being cut into a plurality of sections, each of which is sufficiently short to prevent its becoming wound about following rotating parts of the mower.

Since the construction as illustrated is, obviously, capable of considerable modification without departing from the spirit of my invention, I do not wish to be understood as limiting myself to the specific structure herein shown and described except as hereinafter claimed.

I claim:

1. In a lawn mower, a cutter-reel comprising a rotatable spindle, means to rotate said spindle at high speed, and a plurality of cutters mounted on said spindle, said cutters comprising a multiplicity of cutter-knife sets axially-spaced on said spindle, the knives of each set operating in the same annular path and each including a pair of cutting edges concentric with the spindle and flaring rearwardly with respect to the direction of rotation of the spindle and terminating in concave edge portions facing in the direction of rotation and extending laterally outward of the knives substantially in the direction of the axis of the spindle to deflect unsevered grass outwardly into the path of succeeding knives of the adjacent series, said knives each having a rearwardly disposed tang shaped to conform to surface of the spindle and connecting means joining the rear ends of said tangs to the forward ends of the succeeding cutter of the series whereby said blades may be brought into clamping engagement with the spindle.

2. In a lawn mower, a cutter-reel comprising a cylindrical spindle, means to rotate said spindle at high speed, and a plurality of cutters mounted on said spindle, said cutters comprising a multiplicity of cutter-knife sets axially-spaced on said spindle, the knives of each set operating in the same annular path and each including a cutter face and a rearwardly disposed tang, said tang having its inner face shaped to conform to and receive the spindle and the combined lengths of the shaped inner faces of the tangs being less than the perimeter of the spindle and connecting means joining the rear ends of said tangs to the forward ends of the succeeding cutter of the series whereby said blades may be brought into clamping engagement with the spindle.

3. In a lawn mower, a cutter-reel comprising a rotatable spindle, means to rotate said spindle a high speed, and a plurality of cutters mounted on said spindle, said cutters comprising a multiplicity of cutter-knife sets axially-spaced on said spindle, the knives of each set operating in the same annular path and each including a pair of cutting edges concentric with the spindle and flaring rearwardly with respect to the direction of rotation of the spindle and terminating in concave edge portions facing in the direction of rotation and extending laterally outward of the knives substantially in the direction of the axis of the spindle to deflect unsevered grass outwardly into the path of succeeding knives of the adjacent series, said knives each having a rearwardly disposed tank shaped to conform to surface of the spindle and connecting means joining the rear ends of said tangs to the forward ends of the succeeding cutter of the series whereby said blades may be brought into clamping engagement with the spindle, and a key mounted on at least one of the connecting means of each cutter series and engaged in a longitudinally extending slot in the spindle.

4. In a lawn mower, a cutter-reel comprising a spindle, means to rotate said spindle at high speed, and a plurality of cutters mounted on said spindle, said cutters comprising a multiplicity of cutter-knife sets axially-spaced on said spindle, the knives of each set operating in the same annular path and each including a cutter-face and a rearwardly disposed tang shaped to conform to and receive the surface of the spindle and connecting means joining the rear ends of said tangs to the forward ends of the succeeding cutter of the series whereby said blades may be brought into clamping engagement with the spindle, and a key mounted on at least one of the connecting means of each cutter series and engaged in a longitudinally extending slot in the spindle.

5. In a lawn mower, a cutter-reel comprising a cylindrical spindle, means to rotate said spindle a high speed, and a plurality of cutters mounted on said spindle, said cutters comprising a multiplicity of cutter-knife sets axially-spaced on said spindle, the knives of each set operating in the same annular path and each including a cutter face and a rearwardly disposed tank shaped to conform to and receive the surface of the spindle, the combined lengths of the shaped portions of the tangs being less than the perimeter of the spindle and connecting means joining the rear ends of said tangs to the forward ends of the succeeding cutter of the series whereby said blades may be brought into clamping engagement with the spindle, and a key mounted on at least one of the connecting means of each cutter series and engaged in a longitudinally extending slot in the spindle.

6. In a lawn mower, a cutter-reel comprising a rotatable spindle, means to rotate said spindle at high speed, a plurality of cutters mounted on said spindle, said cutters comprising a multiplicity of cutter-knife sets axially-spaced on said spindle, the knives of each set operating in the same annular path and the paths of the knives of adjacent sets overlapping, said knives each including a pair of cutting edges concentric with the spindle and flaring rearwardly with respect to the direction of rotation of the spindle, the cutting edges of each knife terminating in concave edge portions facing in the direction of rotation and extending laterally outward of the knives substantially in the direction of the axis of the spindle to deflect unsevered grass outwardly into the path of succeeding knives of the adjacent series.

7. In a lawn mower, a cutter-reel comprising a rotatable spindle, means to rotate said spindle at high speed, a plurality of cutters mounted on said spindle, said cutters comprising a multiplicity of cutter-knife sets axially-spaced on said spindle, the knives of each set operating in the same annular path and the paths of the knives of adjacent sets overlapping, said knives each including a pair of cutting edges concentric with the spindle and flaring arcuately rearwardly with respect to the direction of rotation of the spindle, the cutting edges of each knife terminating in concave edge portions facing in the direction of rotation and extending laterally outward of the knives substantially in the direction of the axis of the spindle to deflect unsevered grass outwardly into the path of succeeding knives of the adjacent series, and a deflector arranged in advance of the spindle and above a horizontal plane including the axis thereof to deflect longer grass to cause said knives to enter the grass at substantially right angles thereto.

8. In a lawn mower, a cutter-reel comprising a rotatable spindle, means to rotate said spindle a high speed, a plurality of cutters mounted on said spindle, said cutters comprising a multiplicity of cutter-knife sets axially-spaced on said spindle, the knives of each set operating in the same annular path and the paths of the knives of adjacent sets overlapping, said knives each including a pair of cutting edges concentric with the spindle and flaring arcuately rearwardly in the direction of rotation of the spindle, the cutting edges of each knife terminating in concave edge portions facing in the direction of rotation and extending laterally outward of the knives substantially in the direction of the axis of the spindle to deflect unsevered grass outwardly into the path of succeeding knives of the adjacent series, and a straight ledger bar arranged beneath the reel parallel to the axis thereof and over which the blades pass in slightly spaced relation.

9. In a lawn mower, a cutter-reel comprising a rotatable spindle, means to rotate said spindle at high speed, a plurality of cutters mounted on said spindle, said cutters comprising a multiplicity of cutter-knife sets axially-spaced on said spindle, the knives of each set operating in the same annular path and the paths of the knives of adjacent sets overlapping, said knives each including a pair of cutting edges concentric with the spindle and flaring arcuately rearwardly in the direction of rotation of the spindle, the cutting edges of each knife terminating in concave edge portions facing in the direction of rotation and extending laterally outward of the knives substantially in the direction of the axis of the spindle to deflect unsevered grass outwardly into the path of succeeding knives of the adjacent series, a deflector arranged in advance of the spindle and above a horizontal plane including the axis thereof to deflect longer grass to cause said knives to enter the grass at substantially right angles thereto, and a straight ledger bar arranged beneath the reel parallel to the axis thereof and over which the blades pass in slightly spaced relation.

GEORGE F. KNOWLES.

REFERENCES CITED

The following references are of record in the file of this patent:

UNITED STATES PATENTS

| Number | Name | Date |
|---|---|---|
| 340,240 | Perrin | Apr. 20, 1886 |
| 490,781 | Beekman | Jan. 31, 1893 |
| 1,370,352 | Parmley | Mar. 1, 1921 |
| 1,818,220 | Gratiot | Aug. 11, 1931 |
| 2,082,600 | Squires et al. | June 1, 1937 |
| 2,110,147 | Mable | Mar. 8, 1938 |
| 2,225,119 | Kinkead | Aug. 28, 1939 |